United States Patent [19]

Stent et al.

[11] Patent Number: 5,495,523
[45] Date of Patent: Feb. 27, 1996

[54] METHOD FOR LOW PRIORITY TELEPHONY SYSTEM ASSISTED DIALING

[75] Inventors: Robert J. Stent, Westford, Mass.; B. Scott Smith, Londonderry; Anthony Curreri, Litchfield, both of N.H.

[73] Assignee: Davox Corporation, Westford, Mass.

[21] Appl. No.: 251,739

[22] Filed: Jun. 1, 1994

[51] Int. Cl.$^6$ .................................................. H04M 3/00
[52] U.S. Cl. ........................... 379/265; 379/266; 379/216
[58] Field of Search .................................... 379/208, 265, 379/266, 216, 309, 209

[56] References Cited

U.S. PATENT DOCUMENTS

| | | | |
|---|---|---|---|
| 5,185,782 | 2/1993 | Srinivasan | 379/266 |
| 5,247,569 | 9/1993 | Cave | 379/266 |
| 5,278,898 | 1/1994 | Cambray et al. | 379/266 |
| 5,295,184 | 3/1994 | Smith et al. | 379/216 |
| 5,309,505 | 5/1994 | Szlam et al. | 379/265 |
| 5,311,574 | 5/1994 | Livanos | 379/309 |
| 5,343,518 | 8/1994 | Kneipp | 379/266 |

*Primary Examiner*—Jeffery Hofsass
*Assistant Examiner*—Parag Dharia
*Attorney, Agent, or Firm*—Daniel J. Bourque; Anthony G. M. Davis; Michael J. Bujold

[57] ABSTRACT

A method for maintaining disconnected call record events in a pending condition is provided until an available agent is acquired to service the disconnected call record event. The method includes the steps of reprioritizing the disconnected call record event to a lower priority level value and comparing the priority level value of the disconnected call record event with the priority levels of the additional pending call record events. Upon the disconnected call record event having a priority level value equal to or higher than the additional call record events, an available agent is requested and a second outbound call is placed for the previously disconnected call record event. The requested available agent is connected to the second outbound call upon an outside party answering the second outbound call.

2 Claims, 3 Drawing Sheets

METHOD FOR LOW PRIORITY TELEPHONY SYSTEM ASSISTED DIALING

RELATED APPLICATIONS

This Application is related to U.S. patent application of Scott Smith and Gerry Pearson, Entitled A METHOD FOR ALLOCATING AGENTS WITH PREDETERMINED ATTRIBUTES TO A TELEPHONE CALL CAMPAIGN, the co-pending U.S. patent application 08/252,121 is fully incorporated herein by reference.

FIELD OF THE INVENTION

This invention relates to telephone management systems, and more particularly, to a method for reprioritizing and redialing previously dialed telephone numbers when an agent later becomes available.

BACKGROUND OF THE INVENTION

Automated dialing systems presently used in the prior art automatically dial telephone numbers contained within call records. Upon reaching an outside party, the automated dialing system places the outside party on hold with a recorded message, while waiting for an available agent to service the call. Often, the outside party hangs up on the recorded message or the message plays to completion, thereby cancelling the outbound dial. Once the call is cancelled, the call record is disposed of by returning the call record to the group of call records requiring a dial.

A limitation of the prior art is the lack of indicia that the cancelled call was connected to an outside party. A further limitation is that the call record, once returned to the group of call records awaiting dialing, will reach the same outside party and again place the outside party on hold.

The limitations of the prior art are increased when the automated dialing system utilizes an automatic pacing method setting the ratio of agents servicing a call to the number of outbound dials generated by the automated dialing system. When the ratio is set too high, a large number of calls are put on hold and thus, results in an increased number of cancelled calls. Each cancelled call signals the automated dialing system to initiate a new dial, thereby maintaining the increased number of cancelled calls and resulting in system dialing inefficiencies.

Accordingly, what is needed is a method for redialing a cancelled or aborted call placed to an outside party shortly after the initial connection has been made to that outside party when an agent is available to handle the call. Further, a low priority rating should attach to the redial call such that the regular outbound dialing of the automated dialing system is not affected. Further, the cancelled call should be given a pending status such that the automatic pacing ratio of the system would be dynamically adjusted to reflect the pending redial, thereby resulting in a substantially reduced number of cancelled calls.

SUMMARY OF THE INVENTION

The present invention features a method for low priority assisted dialing by a telephony system. The method includes the steps of receiving a first call record and establishing a first call record event associated with that call record. As a telephone number contained within the call record connects to an outside party, a high priority rating is given to the call record event.

After the telephone line connection to the outside party is terminated, due to the outside party hanging up (call aborted) or to the hold message coming to an end (call cancelled), the call record event continues in a pending condition and receives a lower priority rating. The priority of the call record event having a lower priority rating is compared with other pending call record events which have a higher priority rating when placed in a holding position awaiting an available agent.

Once all of the other pending call record events with a higher priority rating are removed from the hold position and/or reassigned priority ratings lower than the pending call record event, an agent is requested from the telephony system to service the pending lower priority call record event. The telephony system dials the telephone number contained within the call record and the requested agent resource is connected to the outside party immediately upon answering.

An advantage of the present invention is that by placing the cancelled call in a pending state, the pacing ratio of outbound dials to agents is dynamically altered to reflect the pending call. Since the call record events remain pending, no new outbound dials is generated, thereby dynamically controlling the number of outbound dials and reducing the number of cancelled calls.

An additional advantage of the present invention is the reduction of idle time of the agents who are normally idle after all calls on hold have been serviced. Instead of being idle when all call records are completed, the agents are directly connected to connecting calls.

A further advantage of the present invention is that by redialing a call record which had previously been connected to an outside party, the likelihood of connecting the call with the outside party a second time is increased, thereby increasing the system efficiency.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
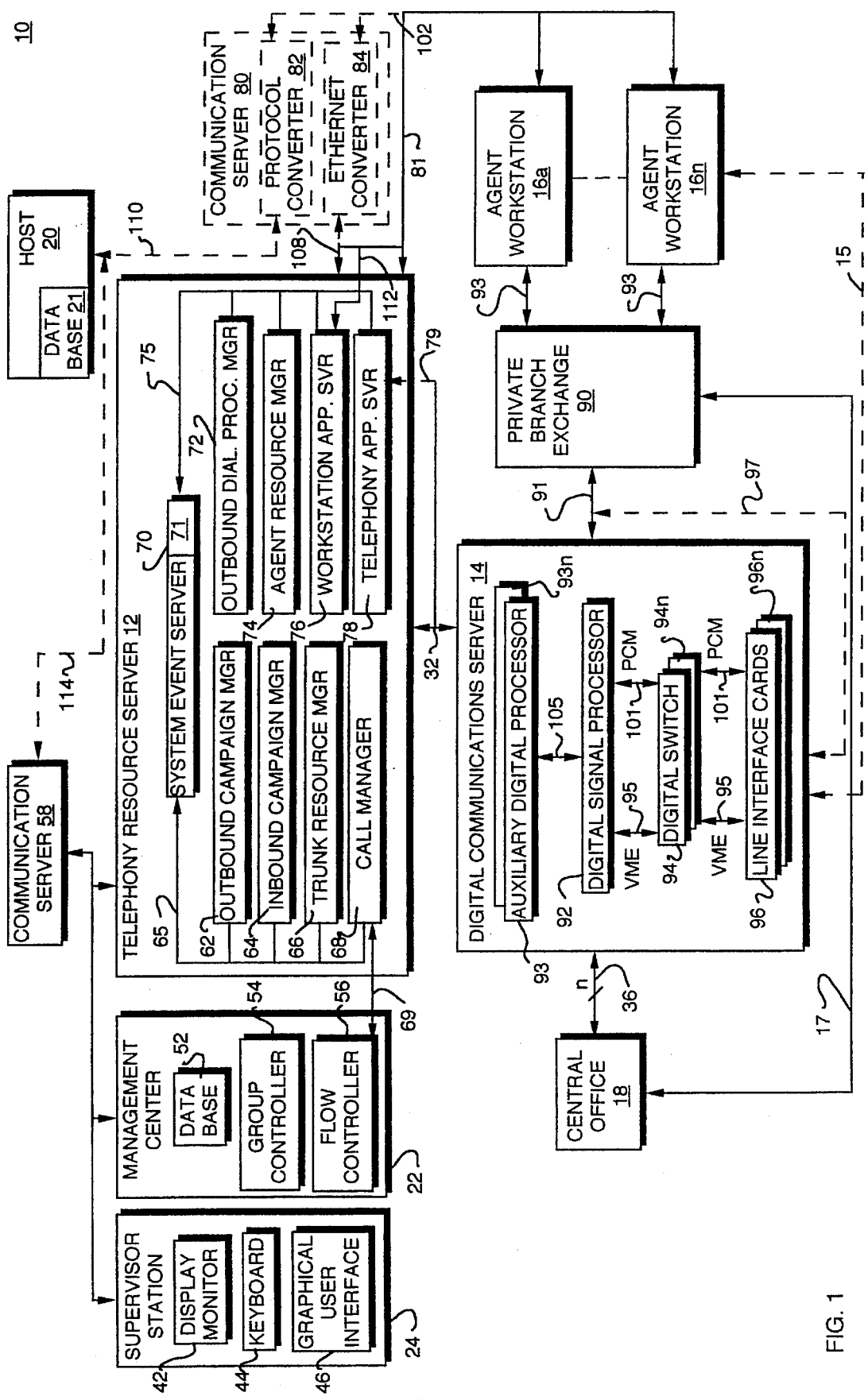
FIG. 1 is a diagrammatical representation of a telephony system capable of providing a low priority assisted dialing in accordance with the present invention.

A telephony system 10, FIG. 1, which utilizes a method for low priority assisted dialing, is described in co-pending U.S. application, 08/252,121 and assigned to the assignee of the present invention and incorporated herein by reference.

Outbound dials to an outside party, generated by the telephony system 10, are controlled by the outbound dialing processing manager 72 of the telephony resource server 12. The outbound dialing processing manager 72 controls the processing of the call record from the originating request by the outbound campaign manager 62 for an outbound dial, to the generation of the outbound dial signals by the digital signal processor 92. Upon reaching an outside party, the outbound dialing processing manager 72 sends a request to the agent resource manager 74 for an agent to service the call record.

Figure 2A:
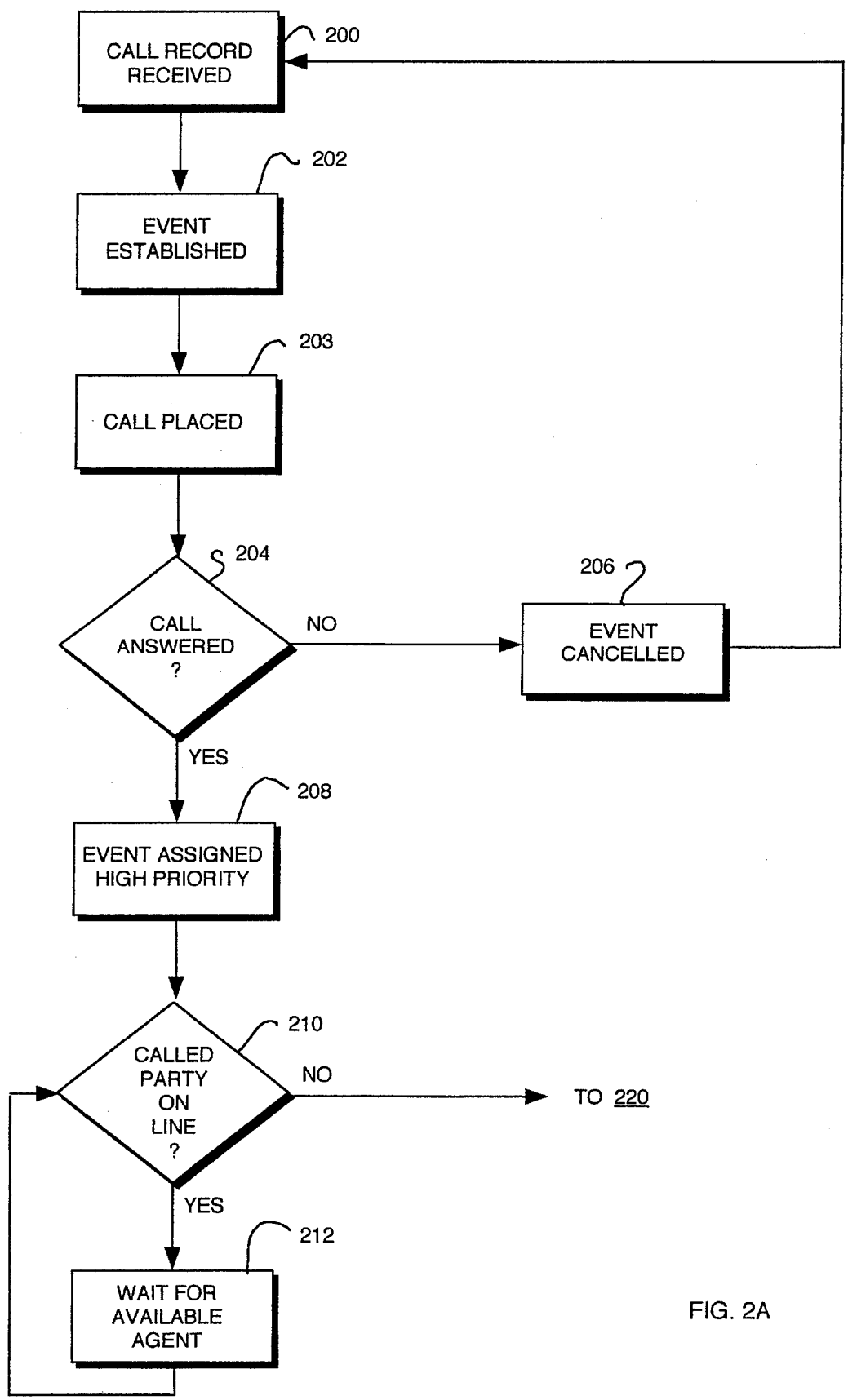
FIG. 2A is a flow diagram showing the steps of establishing a call record event and placing an outbound dial.
Figure 2B:
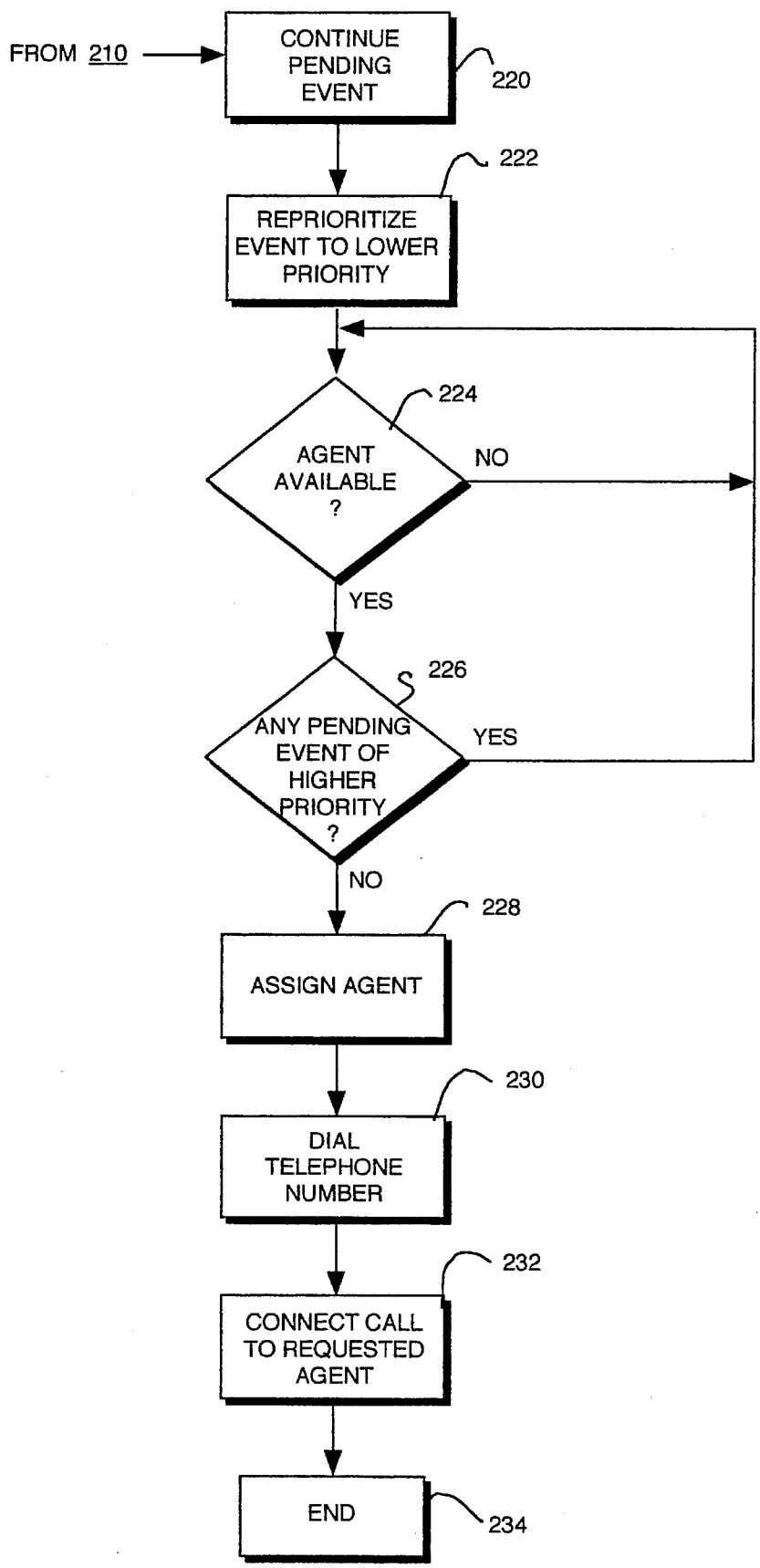
FIG. 2B is a flow diagram showing the steps of processing the pending call record event after the call to the outside party has been cancelled or aborted.

Referring to FIGS. 2A–2B, the steps for utilizing a low priority assisted dialing are discussed in greater detail. At step 200, FIG. 2A, the outbound dialing processing manager receives the call record from the outbound campaign manager to begin processing the call record. To initiate the call processing, the outbound dialing processing manager establishes an internal event, step 202, for controlling the call record processing. Subsequently, the outbound dialing processing manager sends a request to the digital signal processor to generate the appropriate outbound dial signals of a telephone number contained within the call record, step 203.

The digital signal processor detects whether or not a voice answers the outbound call and reports back to the outbound dialing processing manager. Those skilled in the art will recognize that the outbound dialing processing manager may be instructed to detect a message played by an answering machine as well as a voice. If the call is not answered after a predetermined number of rings, step 204, the event established by the outbound dialing processing manager is cancelled, step 206, and processing returns to step 200 to receive a new call record and may perform other steps such as playing a hold message and placing the called party on hold.

If the call is answered by a voice, step 204, the event is assigned a high priority rating, step 208, and the outbound dialing processing manager sends a request to the agent resource manager for an agent to service the call record.

The request may be for an agent possessing specific attributes as described in the co-pending U.S. patent application 08/252,121) described above. The agent resource manager assigns agents to the outbound dialing processing manager as they become available based on the priority level of the request, whereby the highest priority request receives the first available agent meeting the agent request. While the outbound dialing processing manager waits for an agent to service the answered call, the outbound dialing processing manager may instruct the digital signal processor to play a predetermined recorded message to the outside party placed on hold. As long as the called outside party remains on the telephone line, step 210, the outbound dialing processing manager waits for an available agent, step 212, to be assigned by the agent resource manager.

If the called outside party terminates the call, however, or if the recorded message is played to completion, thereby causing the call to be terminated before an agent is assigned to the call record, the event assigned to that call record is not cancelled. Rather, the outbound dialing processing manager maintains the event in a pending condition, step 220, for further processing of the call record upon the availability of an agent.

Because the call has been terminated and the imminence of allocating an agent to service the call has been removed, the outbound dialing processing manager reprioritizes the event with a lower priority rating, step 222. This lower priority rating places the pending event below the priority level of other events generated by the outbound dialing processing manager which have an active call on hold waiting for an available agent, thus having higher priority ratings. The call remains pending as an event, although at a lower priority, since it is desired to call the party back in as short a period of time as possible given that it is known that the party is at the number being called.

The outbound dialing processing manager re-queues the request to the agent resource manager, step 224, for an agent with a lower priority rating. If there is an active event with a higher priority or a pending event with a higher priority, the outbound dialing processing manager continues to wait for an available agent with a flow priority rating, step 226. Further, if a pending event, with the same priority, is waiting for an available agent, the pending event which first entered the waiting condition or which was first queued (FIFO) will receive the next available agent first.

When an agent request is serviced, and only after an available agent is identified, the outbound dialing processing manager sends a request to the digital signal processor to dial the telephone number within the call record, step 230. Obtaining the agent first is contrary to usual procedures for active events which place the outbound dial first before acquiring the agent to service the call, and is a feature of the present invention to ensure that an agent is available immediately if the call is answered since the called party has previously answered the call and has been placed on hold for an extended time period.

Upon reaching a voice response, the outbound dialing processing manager connects the called outside party to the requested available agent, step 232. The outbound dialing processing manger retains the pending event until the call has been completed, step 234, and subsequently disposes of the call record.

Modifications and substitutions by one of ordinary skill in the art are considered to be within the scope of the present invention which is not to be limited except by the claims which follow.

What is claimed is:

1. A method of reprioritizing and redialing a plurality of call record events by an automated telephony system, comprising the steps of:

receiving at least a first call record including a telephone number to be dialed by said automated telephony system;

establishing at least a first call record event associated with said received first call record, said automated telephony system including a plurality of previously established pending call record events associated with a plurality of previously received call records, each previously established pending call record event having a preassigned priority level;

placing a call to said telephone number included in said received at least a first call record;

assigning a first priority level to said at least a first call record event by said automated telephony system as said automated telephony system detects a first telephone line connection to an outside party answering said placed call;

maintaining as pending said first call record event after said detected first telephone Line connection to said outside party becomes terminated;

reprioritizing said pending at least a first call record event from said first priority level to a second priority level after said detected first telephone line connection becomes terminated, said second priority level having a priority level value lower than a priority level value of said first priority level;

comparing said second priority level value of said pending first call record event with said preassigned priority level value of each of said plurality of previously established pending call record events associated with said plurality of previously received call records;

requesting an agent resource from said automated telephony system, for servicing said at least a first call record event upon said pending first call record event having a priority level value equal to or higher than said preassigned priority level value of each of said plurality of previously established pending call record events;

dialing said telephone number included in said first call record by said automated telephone system, for acquiring a second telephone line connection to said outside party, after requesting said agent resource; and connecting said acquired second telephone line connection to said requested agent resource upon an outside party answering said second telephone line connection.

2. The method of claim 1, wherein said automated telephony system includes an outbound dialing processing manager for reprioritizing and redialing said plurality of call record events.

* * * * *